June 7, 1932.  M. J. PAYNE  1,861,936
TIRE VALVE
Original Filed Feb. 21, 1925
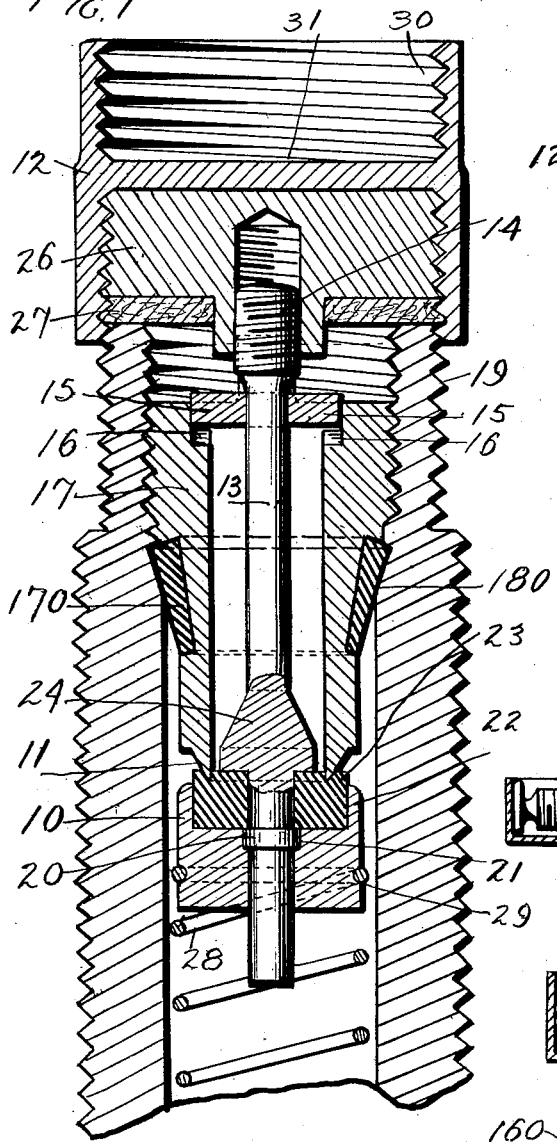
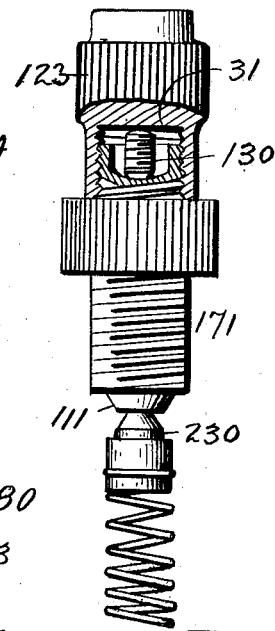
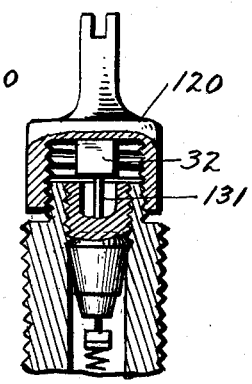
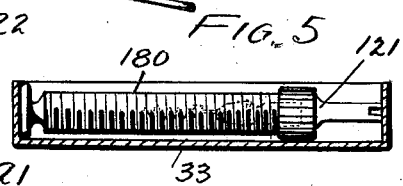
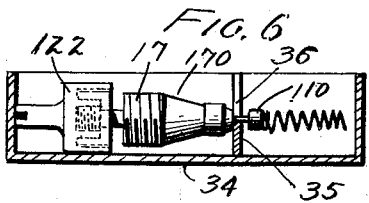
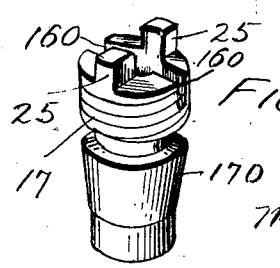
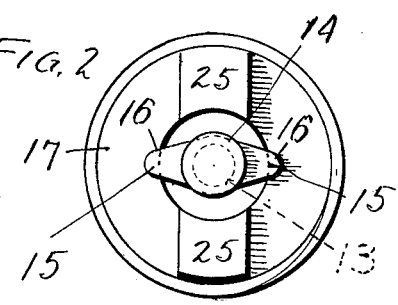
Inventor
Marshall J. Payne
By Chas. J. Williamson
Attorney Patented June 7, 1932

1,861,936

UNITED STATES PATENT OFFICE

MARSHALL J. PAYNE, OF STAUNTON, VIRGINIA, ASSIGNOR TO THE PAYNE VALVE CORPORATION, OF STAUNTON, VIRGINIA, A CORPORATION OF VIRGINIA

TIRE VALVE

Application filed February 21, 1925, Serial No. 10,946. Renewed October 30, 1931.

The requirements to fulfill or realize the commercial demands in a valve for pneumatic tires are the minimum of cost of manufacture and the highest possible efficiency in performing the intended function of preventing accidental or unintended escape of air from the tire and efficiency depends upon the factors of construction that assure the proper seating of the valve at all times and the maintenance of the valve in a condition after manufacture and up to the time it is put in use which will assure its fitness for use. The valve stem or pin which carries the valve head under present practice is most satisfactorily and economically made from commercial wire, and the provision thereon or the attachment thereto of the valve head and other projecting members whose position should be fixed thereon at all times create problems that affect manufacture and reliability of operation. One of the objects of my invention is to solve satisfactorily these problems. Between the time the valve mechanism is finished and it is put in use, as when it is stored in stock for sale, the rubber or other yieldable material carried by the valve head for contact with the seat, if constantly pressed upon the seat by the seating spring by which the valve is provided will be injured and thereby unfitted for dependable or efficient operation. One of the objects of my invention is to hold the valve head in such position during the period stated as will keep the gasket or packing out of contact with the valve seat.

My invention consists in whatever is described by or is included within the terms or scope of the appended claims.

In the drawing:

Fig. 1 is a vertical section of enough of a tire valve to illustrate an embodiment of my invention;

Fig. 2 is a top plan view with the valve seating cap removed;

Fig. 3 is a detail view illustrating the use of the valve seating cap to hold the valve head gasket off the valve seat;

Fig. 4 is a similar view illustrating another way of holding the valve off its seat;

Figs. 5 and 6 are respectively views partly in elevation and partly in vertical section illustrating the utilization of the packing box for holding the valve head off its seat to avoid pressure of the gasket;

Fig. 7 is a detail view in perspective of the valve insides embodying my invention.

Referring particularly to Figs. 1 and 2 it will be found that my invention as illustrated therein is embodied in the tire valve of the type of my Patent No. 1,333,091 issued March 9, 1920, in which the valve head, 10, is drawn and held positively to its seat, 11, by a screw device which comprises a cap, 12, with internal threads which engage threads on the valve stem or pin, 13, at the outer end, 14, thereof, to produce longitudinal movement of the stem to draw the valve head to its seat, the stem being provided with means to allow such longitudinal movement but prevent rotary movement of the stem that consist of radial projections or wings, 15, that at diametrically opposite sides engage longitudinally extending grooves or slots, 16, in the tubular valve housing or body, 17, which screws into the outer end of the tire stem, 18.

The matter of securing the valve head, 10, to the stem or pin, 13, so that an air tight connection will exist and so that longitudinal shifting of the valve head along the stem is impossible from any accidental cause in the use of the valve is a vital one both as regards cost and dependability of the valve mechanism. Upon the stem, 13, within the valve body, 10, is an enlargement, 20, which may be formed by a rolling, stamping, swaging or other suitable operation. The diameter of said enlargement is such that the valve head may be slid along the stem over the enlargement by the provision of a hole, 21, that opens into the cup, 22, that receives the gasket or packing, 23. When the enlargement, 20, is positioned within the valve head, 10, by the seating of the bottom of the hole, 21, against the enlargement, 20, then the valve head, 10, is subjected to pressure in some suitable way to contract or squeeze it upon the enclosed stem and the enclosed enlargement, 20, and to reduce the diameter of the hole, 21, over the stem, 13, adjacent the projection, 20, this operation thus fixing the valve head, 10, in the immovable position on the stem required to proper functioning of the valve in connection with its seat and makes an air tight fit between the valve head, 10, and the stem, 13.

The gasket or packing, 23, on its valve seat engaging side is confined by an enlargement, 24, on the stem or pin, 13, integral with the pin and formed by rolling or swaging is thereby formed and fixed in the accurate position that it is important for it to have on the stem or pin.

The wings, 15, for preventing turning of the valve stem constitute a third enlargement or projection on the valve stem, 13, and they may be formed integrally with the valve stem, 13, by rolling or swaging and they may also be formed of a separate piece consisting in the first place of a block or tube having a hole of a size to pass over the stem, 13, to the position thereon at which the wings are to be fixed and then by some suitable squeezing or compressing means contracted upon the stem and with sufficient force to unite with the stem so as to be immovable thereon under the strains or pressures to which the wings will be subjected in the use of the valve. The pressure used may be sufficient slightly to reduce the diameter of the stem where it is encircled by the wings and thus add to the security of the connection of the two.

No use is made of the stem, 13, and wings, 15, to revolve the body or housing, 17, to screw it into and out of the tire tube stem, 18, but for that purpose at the outer end of said body or housing, 15, are two diametrically opposite flat sided lugs, 25, fitted for engagement by some turning device such as a slot in one end of the cap, and these lugs may be so placed with reference to the wings, 15, as to be engaged by the wings on any turning tendency of the stem, 13, and thus serve the purpose of the grooves, or slots 16, to prevent turning of the stem, 13.

The contact of the wings with the lugs, 25, of course, take place when the wings are out of the grooves, 16. Indeed the grooves may be omitted and the lugs alone be used to cooperate with the wings.

It will be seen by reference to Fig. 1 that my invention is embodied in the standardized Schrader construction, the valve body, 17, being entirely contained within the tire tube stem, 18, and as is usual in such construction a gasket or packing, 170, is carried by the body, 17, and contacts with a tapering surface, 180, on the interior of the stem, 18. I make the gasket, 170, thicker at the upper end than at the bottom and tapering to the lower end, this thickening of the upper end having the effect of preventing the gasket turning or rolling up. With the gasket, 170, of uniform diameter from end to end, when the valve insides are inserted into the tire tube stem, 18, the then inner end of the gasket strikes the inclined or tapering surface on such stem and is apt to curl or roll outward. By thickening the gasket, 170, at the upper end, the contact with the inclined stem surface first occurs at such upper end and hence no condition exists to cause outward curling or rolling of the gasket as it is brought into packing contact with the tapering stem surface. I, of course, do not limit the application of my invention to this standardized construction for my invention extends to whatever is described by or is included within the scope or meaning of the claims hereof.

The pressure upon the stem enlargement may be produced by rolling, stamping or in any other way by which the desired result may be secured.

The threads in the cap, 12, for engagement with the threaded outer end, 14, of the stem, 13, may if desired be cut in a block, 26, externally threaded to engage internal thread on the cap, 12, provided originally for screwing on the threads, 19, of the body or housing, 17. I am thus able to make use of caps not originally provided with threads to engage the threaded portion, 14, of the stem. The greater diameter of the original threads on the interior of the cap, 12, compared with the diameter of the threaded portion of the block, 26, to engage the threads on the outer ends of the valve stem assures that the turning of the cap, 12, to longitudinally move the stem, 13, will not unscrew the cap and block, 26. If desired as a matter of precaution the friction between the cap, 12, and the block, 26, may be increased by a washer-like filler, 27, engaging both.

The spring, 28, for moving the valve head to its seat is preferably attached to the valve head by a coil at one end that engages a groove, 29, in the valve head the spring thence extending inward through the tire tube stem, 18, and at its other end engaging a shoulder or bearing in the interior of said tube, 18, to give the reaction of the spring to seat the valve. Such end of the spring is flared or enlarged to prevent entrance in the bore beyond the shoulder.

The cap, 12, shown in Fig. 1 has internal threads, 30, for screwing upon the body threads, 19, when the cap is inverted from the position shown in Fig. 1 corresponding to that shown in Fig. 3 an internal surface, 31, may engage the outer end of the stem, 130, and push the valve gasket or packing, 230, off the seat, 111, and to hold it off the seat during the time when the valve is packed and not in use and thus damaging pressure of the gasket upon its seat will be averted. As shown in Fig. 4 the same end may be secured and in a valve of the Schrader type by having between the cap, 120, and the outer end of the valve stem or pin, 131, a block, 32, of wood, rubber or other material which will hold the valve packing or gasket off the valve seat and which is discarded or thrown away when the valve insides are installed.

As shown in Figs. 5 and 6 the valve may be so packed in its packing box as so long as it is in the box, the gasket or packing will be held out of contact with the valve seat. In Fig. 5 the complete valve including the tire stem tube, 180, is placed in a packing box, 33, whose length is less than the total length of the valve so that with the valve cap, 121, partially unscrewed from the threaded outer end of the valve stem the valve head gasket will be pushed off the valve seat and kept off the same so long as the device is in the packing box, 33. In Fig. 6 the packing box, 34, is constructed to contain only the valve mechanism proper not including the tire tube stem and may have a size to contain several such valve mechanisms side by side so that when the valve cap, 122, is adjusted as in the case of Fig. 5 and has its outer end in contact with the one end wall of the box, 34, and the valve seat end of the valve body 180, is in contact with a wall or partition, 35, the valve head, 110, will be off the seat and beyond the wall, 35, which has a slot, 36, through which the portion of the valve stem between the seat valve head passes.

As shown in Fig. 7 the slots, 160, which engage the stem wings are cut entirely through the body, 17, from side to side.

The body, 171, shown in Fig. 3 differs in construction from that shown in the other figures and is of a type which partially projects outside the tire tube stem and is threaded for the screw engagement of the cap, 123.

This application as to the means for holding the valve head gasket off its seat is in part a continuation of my application No. 563,469 filed April 25, 1922.

What I claim is:

1. A tire valve having a stem of wire provided at different points along its length with enlargements which are integral therewith and a member around and made separate from the stem and secured thereon by radial compression, the radially engaged portion of the stem being substantially unchanged in diameter, said member being cup-shape and having a recess in which is seated one of said enlargements and a gasket within the cup lying upon the bottom thereof and engaging on opposite sides said enlargements.

2. A tire valve comprising a stem of wire, a tubular valve body through which the stem passes and having a valve seat, said stem at its outer end having screw threads, a cap having threads for moving the stem longitudinally and an enlargement of the stem between its ends made separate therefrom and held thereon by friction and having body engaging portions to restrain the stem from turning when the cap is turned.

3. A valve insides for pneumatic tire valves or the like, comprising a valve pin having a shoulder intermediate its ends, a valve packing support mounted on said pin intermediate its ends and held thereon against longitudinal movements, said support having a cup-shaped portion the bottom of which constitutes the valve packing supporting face, said cup bottom being substantially flush with the shoulder on the pin and a packing seating in part on said cup bottom and in part on said shoulder.

4. A valve insides for pneumatic tire valves or the like comprising a valve pin having an enlargement with a substantially flat shoulder at the top thereof and a valve packing support having a tubular portion and a flat portion at the top thereof, said valve packing support being immovably mounted on said pin with the tubular portion engaging over the enlargement and the flat portion lying substantially flush with the shoulder at the top of the enlargement.

In testimony whereof I hereunto affix my signature.

MARSHALL J. PAYNE.